(12) United States Patent
Richter et al.

(10) Patent No.: US 9,185,899 B2
(45) Date of Patent: Nov. 17, 2015

(54) DEVICE TO AVOID ATTACKS FROM ELECTRO-SENSITIVE ANIMALS

(71) Applicant: R2Z Innovations, Inc., Vancouver (CA)

(72) Inventors: Wolfgang Richter, NW (DE); Faranak Zadeh, Vancouver (CA)

(*) Notice: Subject to any disclaimer, the term of this patent is extended or adjusted under 35 U.S.C. 154(b) by 368 days.

(21) Appl. No.: 13/952,636

(22) Filed: Jul. 28, 2013

(65) Prior Publication Data

US 2015/0027383 A1 Jan. 29, 2015

Related U.S. Application Data

(63) Continuation-in-part of application No. 13/151,508, filed on Jun. 2, 2011, now abandoned.

(60) Provisional application No. 61/350,933, filed on Jun. 3, 2010.

(51) Int. Cl.
*A01M 29/24* (2011.01)

(52) U.S. Cl.
CPC .................................. *A01M 29/24* (2013.01)

(58) Field of Classification Search
CPC .................................................... A01M 29/24
USPC ........ 340/573.1, 573.2, 693.5; 43/132.1, 107, 43/124; 119/712
See application file for complete search history.

(56) References Cited

U.S. PATENT DOCUMENTS

| | | | | |
|---|---|---|---|---|
| 4,846,178 A | * | 7/1989 | Fuxue | A61N 1/40 607/2 |
| 8,611,828 B2 | * | 12/2013 | Richter | A61B 5/0002 455/100 |
| 2006/0152209 A1 | * | 7/2006 | Sasaki | G01R 15/241 324/96 |
| 2007/0107297 A1 | * | 5/2007 | Wijenberg | A01M 1/02 43/107 |
| 2008/0088413 A1 | * | 4/2008 | Richter | B60R 25/2027 340/5.72 |
| 2011/0023792 A1 | * | 2/2011 | Osypka | A01M 29/26 119/721 |

* cited by examiner

*Primary Examiner* — Daniel Wu

(57) ABSTRACT

A system for protecting user's body from the attacks of electro-sensitive animals is provided. The system includes a frequency generator, a modulator, a controller, a level shifter, plurality of electrodes and a power source to provide power to the controller. The controller generates pattern for the modulator and further the controller controls the frequency generator and the level shifter. The frequency generator generates waveforms and frequencies on the instructions programmed by the user in the controller. The modulator then mixes the pattern with waveforms or frequencies. The level shifter shifts results of the modulator to a higher voltage level and further transmits the polarized waveforms and frequencies to the plurality of electrodes. At least one of the electrodes emits the alternating electric field around the user's body as per the pattern, waveforms and frequencies from the level shifter and the another electrode to couple the electric field floating to ground and resulting in creating an aura of electric field around the user's body and further facilitating in protecting the user's body from the attack of electro-sensitive animals.

19 Claims, 3 Drawing Sheets

DEVICE TO AVOID ATTACKS FROM ELECTRO-SENSITIVE ANIMALS

CROSS-REFERENCE TO RELATED APPLICATION

This application is a continuation-in-part of the non-provisional application Ser. No. 13/151,508 filed on Jun. 2, 2011. The non-provisional application Ser. No. 13/151,508 claims priority to U.S. Provisional Application No. 61/350,933 filed on Jun. 3, 2010, the entire contents of which are incorporated herein by references in its entirety.

BACKGROUND OF THE INVENTION

1. Field of the Invention

The present invention generally relates to a wearable device for avoiding attacks from electro-sensitive animals, and more particularly relates to a wearable device for avoiding attacks from electro-sensitive animals by using alternating electric field.

2. Description of Related Art

Insects, especially mosquitoes, can sense a human from distance away by detecting a molecular combination of evaporation from human (animal) skin (dermis). Mosquitoes spread malaria that annually affects two hundred million people and results in two million deaths every year. Diseases like arboviruses, plague, enteric diseases, lyme disease, sleeping sickness, American Trypanosomiasis and others come from the bite or stitch of an insect. Millions of people suffer from itching and scratching as well as possible infections caused by insect attacks. Although, it is well known how they find their host, still it is a challenge to prevent insect attacks.

Typical commercial products deliver chemicals to prevent stitches and bites by confusing the insect's sensitive sensing system with an overwhelming smell. There are a variety of sprays, oils and creams on the market. They all have to be applied either directly on the skin, or sprayed in the environment. However, such products are not comfortable to use, and some of the chemicals are irritants when they get into eyes or harmful for children and smaller animals. Therefore, there is a need of a wearable device to protect attacks from electro-sensitive animals by using alternating electrical field. Further, the wearable device should protect attacks from electro-sensitive animals without the use of chemicals or expensive methods.

SUMMARY OF THE INVENTION

In accordance with the teachings of the present invention a wearable device for avoiding attacks from electro-sensitive animals by using alternating electric field is provided.

An object of the present invention is to provide a wearable device with a controller, a frequency generator, a modulator, a level shifter and plurality of electrodes. The controller generates pattern for the modulator and further controls the frequency generator and the level shifter. The frequency generates waveforms and frequencies on the instructions programmed on the controller. The modulator mixes the pattern with waveforms or frequencies. The level shifter shifts the results of the modulator to a higher level voltage level and further transmits the polarized waveforms and frequencies to the plurality of electrodes. One of the plurality of electrodes emits the alternating electric field around the user's body as per the pattern, waveforms and frequencies from the level shifter and at least one of the another electrode to couple the electric field floating to ground and resulting in creating an electric field around the user's body and further facilitating in protecting the user's body from the attack of electro-sensitive animals.

Another object of the present invention is to provide a wearable device for providing a capacitive coupling for creating a closed AC circuit with the plurality of electrodes and the user's body Another object of the present invention is to provide a wearable device for providing a power source for providing power to other elements of the system, a sensor to sense proximity of the electro-sensitive animals from the user's body and an actuating button for actuating said power source.

Another object of the present invention is to induce electrical signals into the attackers nervous system. The signals cause activities in an electro-sensitive animal's brain, for example to not to attack or stay away from a possible danger. The system will cover human or other living objects with an electric field in a kind of synthetic aura, and means to manipulate these fields will allow generation of cloak with a range of approximately one foot around the human body. When an electro-sensitive animal enters this alternating electric field, thus the nerve system will become confused and overwhelmed with electric impulses that prevent them from continuing their attack. The wearable device creates the alternating electric field with alternating frequencies and voltage levels.

These and other objects, features and advantages of the invention will become more fully apparent in the following detailed description, taken in conjunction with the accompanying drawings.

DETAILED DESCRIPTION OF DRAWINGS

Figure 1:
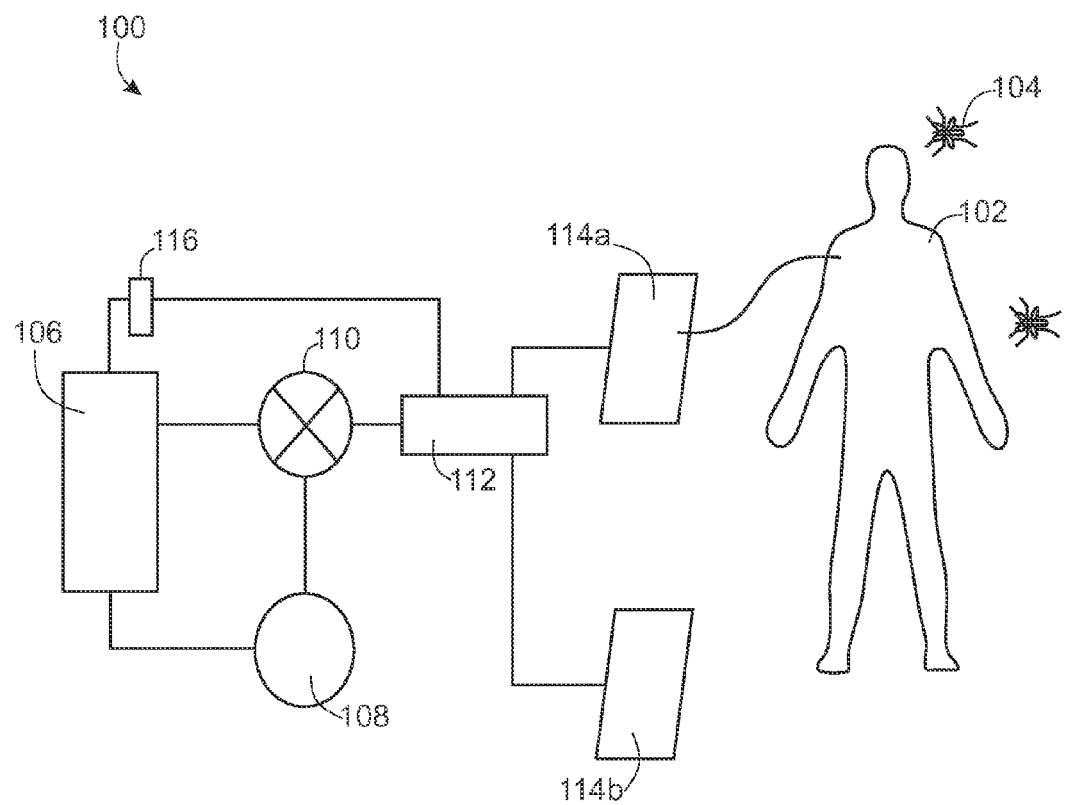
FIG. 1 is a schematic circuit diagram of the system in accordance with a preferred embodiment of the present invention.

While this technology is illustrated and described in a preferred embodiment, a wearable device for protecting user's body from the attacks of electro-sensitive animals may be produced in many different configurations, forms and materials. There is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 is a schematic circuit diagram of a system 100 in accordance with a preferred embodiment of the present invention. The system 100 is for protecting user's body 102 from the attacks of electro-sensitive animals 104. The system 100 includes a controller 106, a frequency generator 108, a modulator 110, a level shifter 112, plurality of electrodes 114 (such as 114a and 114b) and a power source 116 for providing power to the controller 106, the frequency generator 108, the modulator 110, the level shifter 112 and the plurality of electrodes 114. The power source 116 is explained in detail in conjunction with FIG. 2 of the present invention.

The controller 106 generates pattern for the modulator 110 and further controls the frequency generator 108 and the level shifter 112. The modulator 110 mixes pattern with waveform or frequencies. The level shifter 112 shifts results of said modulator to a higher voltage level and further transmits the polarized waveforms and frequencies to the plurality of electrodes 114, such as 114a and 114b. The electrode 114a emits alternating electric field with the pattern, waveforms and frequencies from the level shifter 112 and the electrode 114b couples the alternating electric field floating to ground and resulting in creating an aura of electric field around the user's body 102. The aura of electric field facilitates in protecting the user's body 102 from the attack of electro-sensitive animals 104. In a preferred embodiment of the present invention, the electro-sensitive animal 104 is an insect. Examples of the electro-sensitive animals 104 include but not limited to insects, mosquitoes, ticks, parasites, viruses, snakes, sharks etc. The invention of the present invention protects any living organism such as humans, animals, plants etc.

Figure 2:
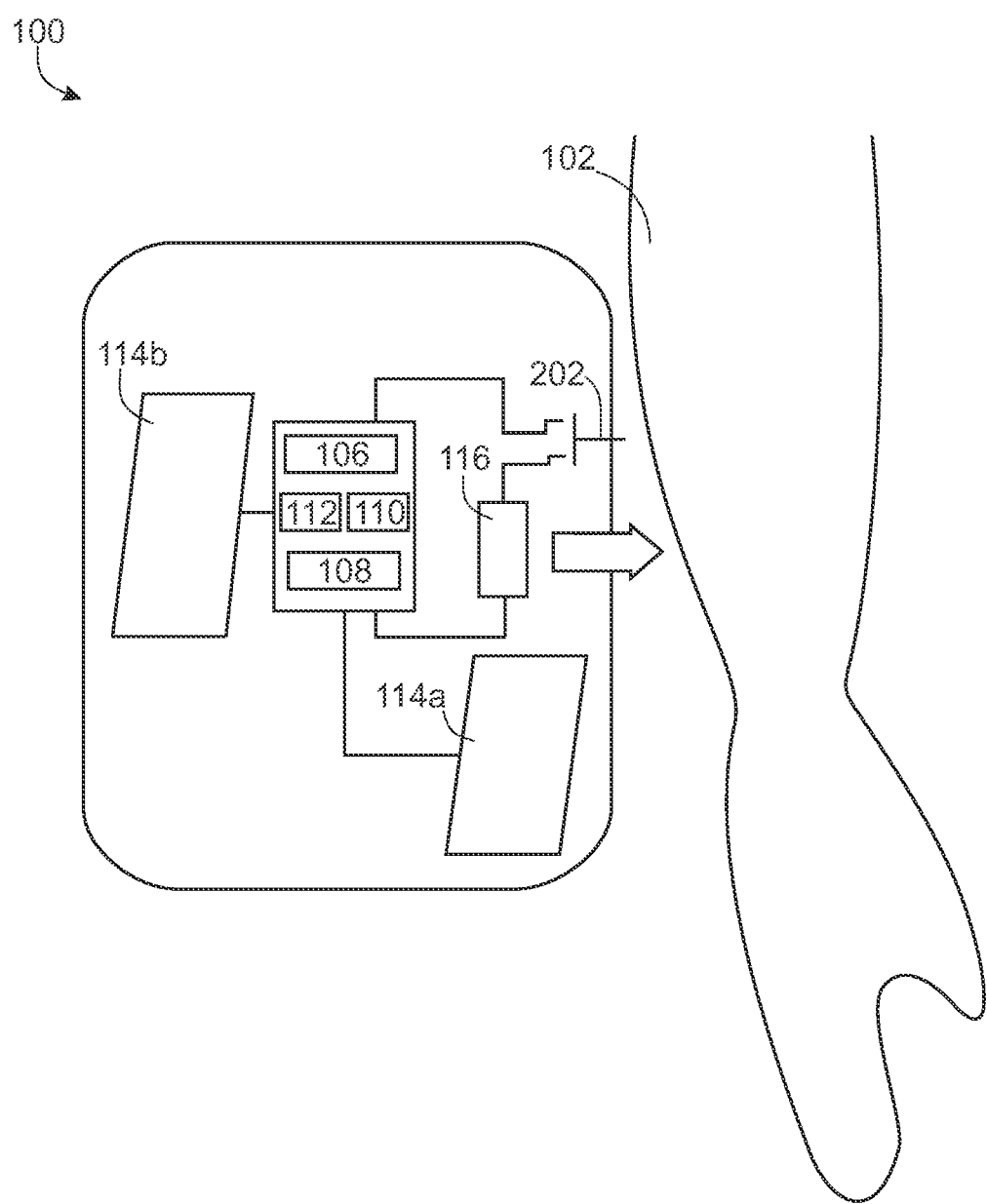
FIG. 2 is a schematic circuit diagram of the system in accordance with another preferred embodiment of the present invention.

FIG. 2 is a schematic circuit diagram of the system 100 in accordance with another preferred embodiment of the present invention. The system 100 further includes an electronic unit 202, such as proximity sensor for sensing the electro-sensitive animals in close proximity of the user's body 102 and sending signals to the controller 106, the frequency generator 108, the modulator 110 and the level shifter 112. However, it will be readily apparent to those skilled in the art that various other sensors may also be used for detecting the presence of electro-sensitive animals near the living body required to be protected. For exemplary purposes, a sensor may detect modulation of the insect's wing flapping speed. In another embodiment of the present invention the electronic unit 202 is a switch for actuating the power source 116.

In a preferred embodiment of the present invention, the power source 116 is a battery. In another preferred embodiment of the present invention, the power source 116 may also be charged wirelessly from other conventional electrical appliances. However, it will be readily apparent to those skilled in the art that various power source 116 may be used without deviating from the scope of the present invention.

Figure 3:
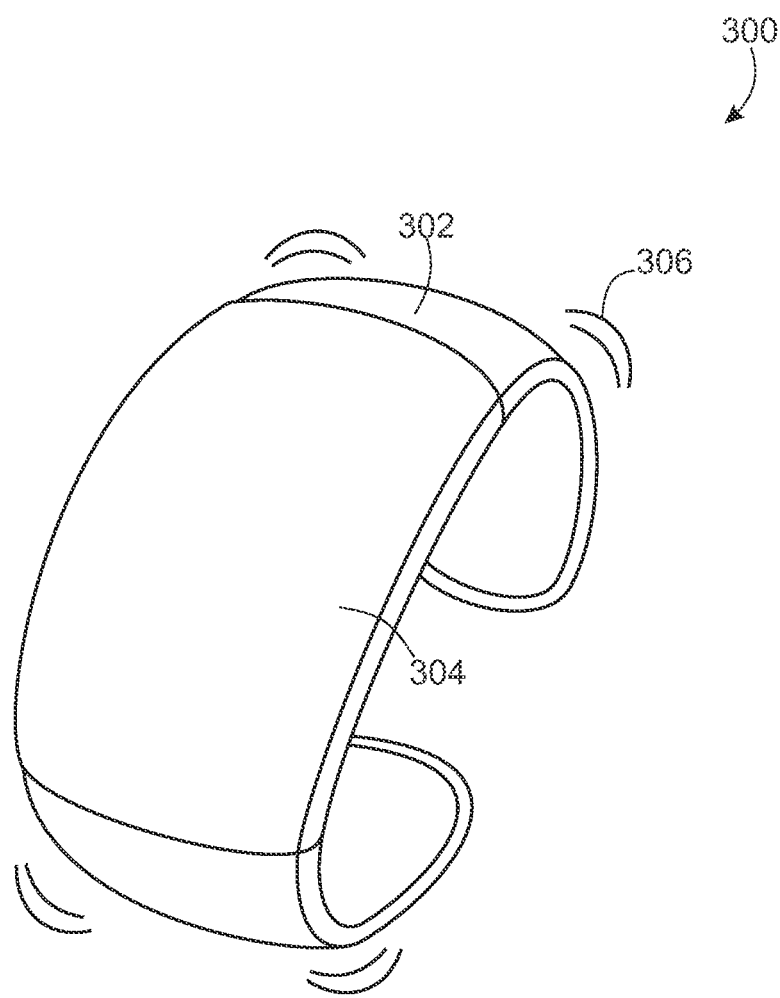
FIG. 3 illustrates a perspective view of a wearable device as an exemplary embodiment of the present invention.

FIG. 3 illustrates a perspective view of a device 300. In a preferred embodiment of the present invention, the device 300 includes a housing 302 worn by said user and a circuit board (not shown in figures) configured inside the housing 302. The circuit board (not shown in figures) includes a frequency generator, a modulator, a controller and a level shifter. The frequency generator, the modulator, the controller, the level shifter, the electrodes and the power source performs the same function as explained in detail in conjunction with FIG. 1 and FIG. 2 of the present invention. The device then creates an aura of electric field 306 for protecting the user from the attacks of electric sensitive animals.

In a preferred embodiment of the electrical device 300 is a wristband. Examples of electrical device 300 include but not limited to headphones, blankets, clothes, shoes, headgears, computing devices (such as phones, laptops, (pads) etc. However, it will be readily apparent to those skilled in the art that many other variations of the electrical device 300 may be envisioned without deviating from the scope of the present invention. The wristband 300 includes the system 100 (Reference from FIG. 1 and FIG. 2) for protecting user's body from the attacks of electro-sensitive units. The wristband 300 further includes a screen 304 for displaying information. The information includes but not limited to level of voltage, level of frequency, time. Further, the screen 304 allows the user to program the controller.

In another preferred embodiment of the present invention, the controller may be programmed with various levels, such as Level 1, Level 2 and Level 3. The levels determine a predetermined value of the frequency and the voltage of the electric field that may be used to protect user's body from the attacks of the electro-sensitive animals.

For Example: In Level 1, the frequency is sweeping from 12 kHz to 175 kHz every 3 seconds and the voltage is changing from 75 eV to 222 eV and back every 6 seconds. In Level 2, the frequency is 238 kHz with 18 periods every 100 ms and the voltage is constant 321 eV. In Level 3, the frequency is switching from 75 kHz to 391 kHz every 1.6 ms and the voltage is 295 eV.

Thus, the screen 304 allows the user to select the Level as per the requirement of the user. However it will be readily apparent to those skilled in the art that many variations of the Levels may be envisioned without deviating from the scope of the present invention.

In another embodiment of the present invention, the system 100 may further be connected to one or more mobile terminals (not shown in Figures). Examples of such mobile terminals include, but are not limited to: the BLACKBERRY™ line of wireless devices manufactured by Research in Motion of Waterloo, Ontario, Calif.; the T-MOBILE G1™ or other mobile terminals compatible with the ANDROID operating system as developed by Google, Inc. of Mountain View, Calif.; the PRADA™ or other mobile terminals manufactured by LG ELECTRONICS MOBILECOMM U.S.A, INC. of San Diego, Calif.; the INSTINCT™ or other mobile terminals manufactured by SAMSUNG TELECOMMUNICATIONS AMERICA, LLC; the XPERIA™ X1 or other mobile terminals manufactured by SONY ERICSSON MOBILE COMMUNICATIONS AB of Sweden; the N96 or other mobile terminals manufactured by NOKIA GROUP of Finland; and the PRE™ or other mobile terminals manufactured by PALM, INC. of Sunnyvale, Calif. In other preferred embodiments, a mobile terminal may comprise a portable personal computer with a sufficiently large, touch-sensitive screen (i.e., a "tablet" or "tablet computer" such as the IPAD™ by APPLE®).

In an exemplary embodiment, a farmer may protect an apple tree from the insects by placing the present invention near the tree. The present invention creates an aura of electric field around the apple tree. The present invention is operated by the farmer. Similarly, the present invention may be programmed or controlled by a mother in order to protect the baby from insects. The system may be placed under the bed of the baby so that the system creates an aura of electric field around the baby.

The present invention offers various advantages. The present invention provides a defense mechanism against mosquitoes and other electro-sensitive animals without the use of chemicals, oils, creams and other expensive methods. The present invention emits electric field and prevents insect attacks within reach of such fields. The present invention is wearable by the user either on wrist, legs, headgears etc. Further, the present invention may also be used by attachment on to clothes, blankets, shoes etc. This makes the invention easy to use and cost effective.

The foregoing discussion discloses and describes merely exemplary embodiments of the present invention. One skilled in the art will readily recognize from such discussion and from the accompanying drawings that various changes, modifications and variations can be made therein without departing from the spirit and scope of the invention.

The invention claimed is:

1. A system for protecting user's body from the attacks of electro-sensitive animals, said system comprising:
   a frequency generator; a modulator; a controller; a level shifter; plurality of electrodes; and a power source for providing power to said controller, said frequency generator, said modulator and said level shifter; characterized in that:
   said controller generates pattern for said modulator and further said controller controls said frequency generator and said level shifter,
   further wherein said frequency generator generates waveforms and frequencies on the instructions programmed by said user in said controller;
   further wherein said modulator mixes pattern with waveform or frequencies;
   further wherein said level shifter shifts results of said modulator to a higher voltage level and further transmits the polarized waveforms and frequencies to the said plurality of electrodes;
   wherein at least one the electrodes emits the alternating electric field around said user's body as per the pattern, waveforms and frequencies from said level shifter and said another electrode to couple the electric field floating to ground and resulting in creating an aura of electric field around said user's body and further facilitating in protecting said user's body from the attack of electro-sensitive animals.

2. The system according to claim 1 further comprising an electronic device wearable by said user, said electronic device to store said controller, said frequency generator, said modulator, said level shifter and said plurality of electrodes.

3. The system according to claim 1 wherein said frequency is 125 Khz.

4. The system according to claim 1 wherein said voltage level is 500 Vpp.

5. The system according to claim 1 wherein said plurality of electrodes emit alternating electric field up to 50 cm around the body.

6. The system according to claim 1 wherein said power source is a battery.

7. The system according to claim 1 further comprising a sensor for sensing said electro-sensitive animals in close proximity of said user's body and sending signals to said controller, said frequency generator, said modulator and said level shifter.

8. The system according to claim 6 further comprising a switch for actuating said power source.

9. A device for protecting user's body from the attacks of electro-sensitive animals, said device comprising:
   an housing worn by said user, said housing comprising plurality of electrodes and a power source;
   a circuit board configured inside said housing, said circuit board comprising a frequency generator; a modulator; a controller and a level shifter;
   wherein said power source for providing power to said controller, said frequency generator, said modulator and said level shifter;
   wherein said controller generates pattern for said modulator and further said controller controls said frequency generator and level shifter;
   further wherein said frequency generator generates waveforms and frequencies on the instructions programmed in said controller;
   further wherein said modulator mixes pattern with waveform or frequencies;
   further wherein said level shifter shifts results of said modulator to a higher voltage level and further transmits the polarized waveforms and frequencies to the said plurality of electrodes;
   wherein at least one the electrodes emits the alternating electric field on said user's body as per the pattern, waveforms and frequencies from said level shifter and at least one of the another electrode to couple the electric field floating to ground and resulting in creating an aura of electric field around said user's body and further facilitating in protecting said user's body from the attack of electro-sensitive animals.

10. The device according to claim 9 further comprising a screen for displaying information and further allowing said user to program said controller.

11. The device according to claim 9 wherein said frequency is 125 Khz.

12. The device according to claim 9 wherein said voltage level is 500 Vpp.

13. The device according to claim 9 wherein said plurality of electrodes emit alternating electric field up to 50 cm around the body.

14. The device according to claim 9 wherein said power source is a battery.

15. The device according to claim 9 further comprising a sensor for sensing said electro-sensitive animals in close proximity of said user's body and sending signals to said controller, said frequency generator, said modulator and said level shifter.

16. The device according to claim 9 further comprising a switch for actuating said power source.

17. The device according to claim 9 wherein said housing is of a wristband.

18. The device according to claim 9 wherein said housing is of a headgear.

19. The device according to claim 9 wherein said housing is of a computing device.

* * * * *